(12) United States Patent
Schloegel et al.

(10) Patent No.: US 8,661,424 B2
(45) Date of Patent: Feb. 25, 2014

(54) AUTO-GENERATION OF CONCURRENT CODE FOR MULTI-CORE APPLICATIONS

(75) Inventors: Kirk Schloegel, Minneapolis, MN (US); Devesh Bhatt, Maple Grove, MN (US)

(73) Assignee: Honeywell International Inc., Morristown, NJ (US)

(*) Notice: Subject to any disclaimer, the term of this patent is extended or adjusted under 35 U.S.C. 154(b) by 699 days.

(21) Appl. No.: 12/874,731

(22) Filed: Sep. 2, 2010

(65) Prior Publication Data
US 2012/0060145 A1    Mar. 8, 2012

(51) Int. Cl.
*G06F 9/45* (2006.01)

(52) U.S. Cl.
USPC .............. 717/155; 717/149; 717/151

(58) Field of Classification Search
None
See application file for complete search history.

(56) References Cited

U.S. PATENT DOCUMENTS

| | | | |
|---|---|---|---|
| 4,901,221 A | | 2/1990 | Kodosky et al. |
| 5,237,691 A | * | 8/1993 | Robinson et al. ............. 717/107 |
| 5,291,587 A | | 3/1994 | Kodosky et al. |
| 5,301,301 A | | 4/1994 | Kodosky et al. |
| 5,577,256 A | * | 11/1996 | Muramatsu et al. ............ 712/27 |
| 5,987,246 A | | 11/1999 | Thomsen et al. |
| 6,026,241 A | * | 2/2000 | Chow et al. .................... 717/152 |
| 6,507,947 B1 | * | 1/2003 | Schreiber et al. ............. 717/160 |
| 6,622,301 B1 | | 9/2003 | Hirooka et al. |
| 6,701,513 B1 | | 3/2004 | Bailey |
| 6,721,884 B1 | * | 4/2004 | De Oliveira Kastrup Pereira et al. ................................ 713/2 |
| 6,917,909 B1 | * | 7/2005 | Markov et al. .................. 703/14 |
| 7,010,787 B2 | | 3/2006 | Sakai |
| 7,017,043 B1 | * | 3/2006 | Potkonjak ..................... 713/176 |
| 7,024,667 B2 | * | 4/2006 | Orii ................................ 717/149 |
| 7,134,113 B2 | * | 11/2006 | Williams ....................... 717/106 |
| 7,222,218 B2 | | 5/2007 | Dutt et al. |
| 7,293,257 B2 | * | 11/2007 | Czerwonka ................... 717/124 |
| 7,340,721 B1 | | 3/2008 | Bailey |
| 7,346,902 B2 | | 3/2008 | Dutt et al. |
| 7,509,244 B1 | * | 3/2009 | Shakeri et al. ..................... 703/7 |

(Continued)

FOREIGN PATENT DOCUMENTS

WO    WO 2010019254 A1 *  2/2010    ............... G06F 9/45

OTHER PUBLICATIONS

Abou-Rjeili, Amine and George Karypis, "Multilevel Algorithms for Partitioning Power-Law Graphs","Technical Report TR 05-034", Oct. 18, 2005, Publisher: University of Minnesota.

(Continued)

*Primary Examiner* — Jason Mitchell
(74) *Attorney, Agent, or Firm* — Fogg & Powers LLC

(57) ABSTRACT

A code generation system comprises a model analyzer configured to identify data dependencies in a data flow diagram that describes functional behavior of an application, wherein the model analyzer is further configured to compute a data and computation map based on the data dependencies and to compute one or more implementation constraints; a model partitioner configured to compute one or more partition boundaries based on the data and computation map and the one or more implementation constraints; and a code generator configured to generate parallelized code based on the data flow diagram, the one or more implementation constraints, and the one or more partition boundaries, wherein the code generator is configured to map the code corresponding to each partition defined by the one or more partition boundaries to one of a plurality of cores of a multi-core processor, and to generate inter-core communication code for at least one line of the data and computation map crossed by the one or more partition boundaries.

20 Claims, 6 Drawing Sheets

(56) References Cited

U.S. PATENT DOCUMENTS

| | | | |
|---|---|---|---|
| 7,603,664 B2 | 10/2009 | Dutt et al. | |
| 7,620,945 B1 | 11/2009 | Song et al. | |
| 7,644,334 B2* | 1/2010 | Hickman et al. | 714/741 |
| 7,685,564 B2 | 3/2010 | Renner | |
| 7,689,958 B1 | 3/2010 | Ball et al. | |
| 7,712,090 B2 | 5/2010 | Stuefe | |
| 7,743,362 B2 | 6/2010 | Peck et al. | |
| 8,261,273 B2* | 9/2012 | Narang et al. | 718/102 |
| 8,359,586 B1* | 1/2013 | Orofino et al. | 717/152 |
| 2002/0095667 A1* | 7/2002 | Archambault | 717/154 |
| 2002/0124012 A1* | 9/2002 | Liem et al. | 707/200 |
| 2002/0162089 A1* | 10/2002 | Lewis et al. | 717/106 |
| 2002/0162097 A1* | 10/2002 | Meribout | 717/155 |
| 2003/0014743 A1* | 1/2003 | Cooke et al. | 717/161 |
| 2003/0037319 A1* | 2/2003 | Narang | 717/144 |
| 2003/0056088 A1* | 3/2003 | Heishi et al. | 712/214 |
| 2003/0182376 A1 | 9/2003 | Smith | |
| 2003/0200540 A1* | 10/2003 | Kumar et al. | 717/161 |
| 2004/0230770 A1* | 11/2004 | Odani et al. | 712/10 |
| 2005/0188364 A1* | 8/2005 | Cockx et al. | 717/159 |
| 2007/0050609 A1* | 3/2007 | Ferren et al. | 712/227 |
| 2007/0226601 A1 | 9/2007 | Pisek et al. | |
| 2007/0226686 A1 | 9/2007 | Beardslee et al. | |
| 2008/0019378 A1* | 1/2008 | Hogan | 370/400 |
| 2008/0126902 A1* | 5/2008 | Hickman et al. | 714/741 |
| 2008/0244472 A1* | 10/2008 | Nayak et al. | 716/2 |
| 2009/0013307 A1* | 1/2009 | Raghavan et al. | 717/106 |
| 2009/0287729 A1* | 11/2009 | Chen et al. | 707/102 |
| 2009/0287958 A1* | 11/2009 | Bhatt et al. | 714/26 |
| 2010/0042981 A1* | 2/2010 | Dreyer et al. | 717/146 |
| 2010/0058346 A1* | 3/2010 | Narang et al. | 718/102 |
| 2010/0131955 A1 | 5/2010 | Brent et al. | |
| 2010/0138810 A1* | 6/2010 | Komatsu et al. | 717/107 |
| 2010/0192128 A1* | 7/2010 | Schloegel et al. | 717/125 |
| 2010/0306736 A1* | 12/2010 | Bordelon et al. | 717/109 |
| 2010/0306750 A1* | 12/2010 | Helovuo | 717/143 |
| 2010/0306753 A1* | 12/2010 | Yi et al. | 717/149 |
| 2011/0161912 A1* | 6/2011 | Eteminan et al. | 717/101 |
| 2011/0209129 A1* | 8/2011 | Komatsu et al. | 717/149 |

OTHER PUBLICATIONS

Bhatt et al., "HiLiTE Test Automation Suite User Guide", "Doc No. AES-R04-004", Oct. 2009, Volume Version 7.4, Publisher: Honeywell International Inc.

Bhatt et al., "An Approach and Tool for Test Generation from Model-Based Functional Requirements", "Proc of 1st International Workshop on Aerospace Software Engineering", 2007.

Castanon et al., "C31 Parallel Benchmark Kernel Report: Hypothesis Testing", "Alphatech", Aug. 30, 1997, Publisher: Honeywell International Inc.

Ferrante et al., "The Program Dependence Graph and Its Use in Optimization", "ACM Transactions on Programming Language and Systems", Jul. 1987, pp. 319-349, vol. 9, No. 3, Publisher: ACM.

Horwitz, Susan and Thomas Reps, "The Use of Program Dependence Graphs in Software Engineering", 1992, pp. 392-411, Publisher: ACM.

Karypis, George and Vipin Kumar, "Multilevel Algorithms for Multi-Constraint Graph Partitioning", "http:www.cs.umn.edu/~karypis", May 5, 1998, Publisher: University of Minnesota—Thesis.

Karypis, George and Vipin Kumar, "Analysis of Multilevel Graph Partitioning", 1995, pp. 1-18, Publisher: ACM.

Karypis et al., "METIS: A Software Package for Partitioning Unstructured Graphs, Partitioning Meshes, and Computing Fill-Reducing Orderings of Sparse Matrices, Version 4.0", 1998, Publisher: University of Minnesota.

"Simulink—Simulation and Model-Based Design", "http://www.mathworks.com/products/simulink accessed Sep. 1, 2010",1994-2010, Publisher: The MathWorks, Inc.

"Real Time Workshop Users Guide", "http://www.mathworks.com/products/rtw/ accessed Sep. 1, 2010", 1994-2010, Publisher: The MathWorks, Inc.

Moulitsas, Irene and George Karypis, "Architecture Aware Partitioning Algorithms", 2008, pp. 42-53, Publisher: Springer-Verlag Berlin Heidelberg.

Schloegel et al., "Parallel Static and Dynamic Multi-Constraint Graph Partitioning", "Concurrency and Computation: Practice and Experience", 2002, pp. 219-240, vol. 14, Publisher: John Wiley & Sons, Ltd.

* cited by examiner

AUTO-GENERATION OF CONCURRENT CODE FOR MULTI-CORE APPLICATIONS

BACKGROUND

Many processing systems include multi-core processors in order to decrease the processing time to perform a task. A multi-core processor includes two or more cores coupled together. Hence, by dividing the operations of a processing task between the multiple cores, an improvement in the time required to complete the processing task can be achieved. However, this improvement is limited by the number of operations in the processing task that can be performed in parallel. For example, commutative operations, such as addition or multiplication of a series of numbers, can be performed in parallel to improve the processing time. However, other operations are serial in nature and cannot be substantially improved through parallel processing. For example, calculating a running total based on user input requires the processor to wait for the user input prior to performing each calculation. Thus, the operation is serial in nature and will not benefit substantially from parallel processing on a multi-core processor.

Parallel performance is also limited by the amount of communications overhead required to integrate the partial results that are computed on different cores. For example, in the case of adding n numbers together, each of p cores can add n/p of the numbers together in parallel. However, after this parallel step, there is a communications step in which the cores exchange the partial sums that have been computed. This is a communications overhead that does not occur when adding the numbers on a single core.

In order to benefit from the improvements offered by a multi-core processor, application code is often parallelized, where appropriate, such that each core is assigned a portion of the processing tasks that can be performed in parallel. However, current techniques for producing parallelized or concurrent application code suffer from various limitations. For example, one technique involves having a programmer write the application code using a parallel language designed for multi-core processing. However, manually producing the code using a parallel language is more prone to human error and places an additional burden on the programmer.

SUMMARY

In one embodiment, a code generation system is provided. The code generation system comprises a model analyzer configured to identify data dependencies in a data flow diagram that describes functional behavior of an application, wherein the model analyzer is further configured to compute a data and computation map based on the data dependencies and to compute one or more implementation constraints; a model partitioner configured to compute one or more partition boundaries based on the data and computation map and the one or more implementation constraints; and a code generator configured to generate parallelized code based on the data flow diagram, the one or more implementation constraints, and the one or more partition boundaries, wherein the code generator is configured to map the code corresponding to each partition defined by the one or more partition boundaries to one of a plurality of cores of a multi-core processor, and to generate inter-core communication code for at least one line of the data and computation map crossed by the one or more partition boundaries.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
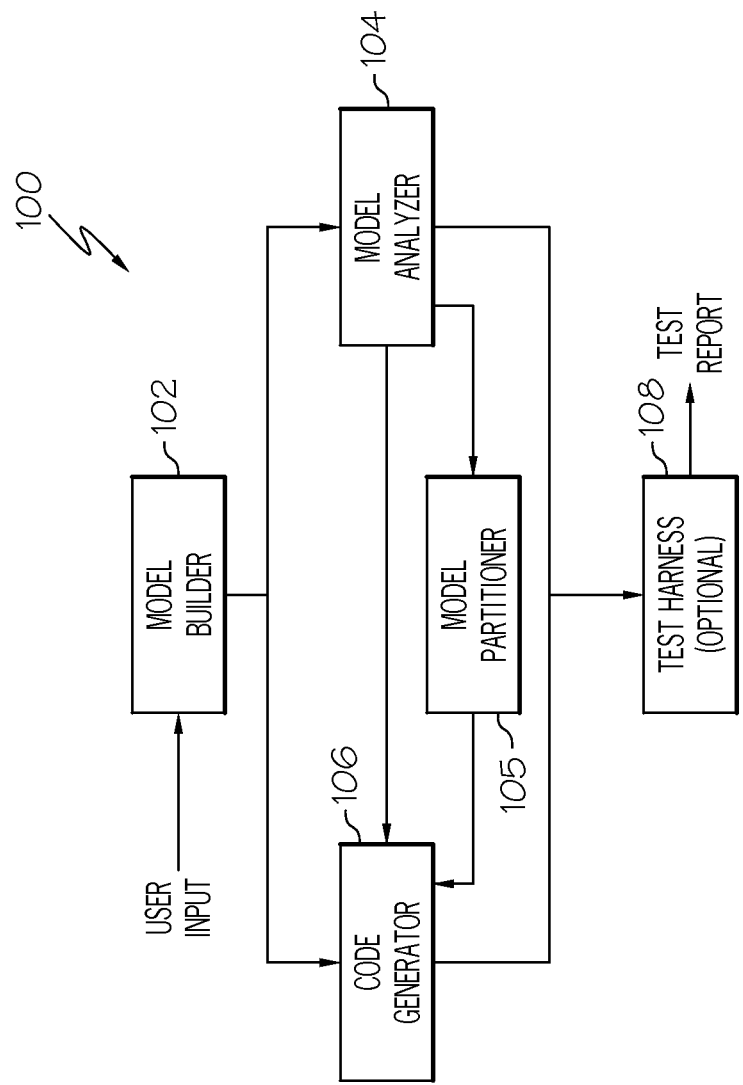
FIG. 1 is a block diagram of one embodiment of a parallel code generation system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

FIG. 1 is a block diagram of one embodiment of a parallel code generation system 100. System 100 includes a model builder 102. Model builder 102 is configured to produce a model of the behavioral requirements of an application based on user input. As used herein, the model of the behavioral requirements of an application is also referred to as a behavioral model. A behavioral model includes different types of functional blocks that are put together in a data flow diagram to describe the functional behavior of the application. An exemplary behavioral model is described in more detail below with respect to FIG. 3.

The model builder 102 can be implemented using any appropriate data modeling tool that enables a user to specify the behavioral requirements of an application. For example, in some embodiments, a modeling tool such as Simulink® produced by The MathWorks, Inc. is used. In other embodiments, other modeling tools using modeling languages, such as the Unified Modeling Language (UML) or Logical Data Structures (LDS), to create data flow diagrams are used.

The model builder 102 outputs the behavioral model to a code generator 106 and a model analyzer 104. The code generator 106 analyzes the behavioral model and results of analysis from the model analyzer 104 to generate the application code. In particular, the model analyzer 104 understands the behavior of each block in the behavioral model. For example, the model analyzer 104 understands that the behavior of an addition block is that the output is the sum of the inputs. The model analyzer 104 also determines the precise data dependencies from the inputs to the outputs based on the type of block and to which blocks it is connected. An exemplary block diagram depicting data dependencies is described in more detail below with respect to FIG. 4.

Based on the data dependencies of the behavioral model, the model analyzer 104 computes a data and computation map corresponding to the behavioral model. A data and computation map depicts the data inputs/outputs and computations performed by each of the blocks in the behavioral model without explicit reference to the corresponding blocks of the behavioral model. An exemplary data and computation map is described in more detail below with respect to FIG. 5.

In addition, the model analyzer 104 computes the number of implementation constraints in the data and computation map. Implementation constraints specify the spatial, temporal, language-specific, hardware-specific, and process-specific constraints and requirements required to keep the parallel threads of the application functionally correct and to support other development tasks such as verification. Additional details regarding partitioning the data and computation map are described below.

The model partitioner 105 then partitions the data and computation map based on the data dependencies. Exemplary partitioning algorithms which can be configured to implement the model partitioner 105 include, but are not limited to, METIS developed at Karypis Lab, CHACO developed at Sandia National Laboratories, and JOSTLE developed by Chris Walshaw at the University of Greenwich.

The number of partitions is dependent on the number of cores in the target multi-core processor on which the generated code will be run. For example, in some embodiments, user input indicating the number of cores is input into the model analyzer 104. In other embodiments, the model analyzer 104 can be configured or hard-coded for a given number of cores. Additionally, in some embodiments, the model analyzer 104 uses additional information regarding the target multi-core processor to compute the partition boundaries. For example, additional information can include, but is not limited to, respective cache size for each core, and the manner in which the processors are connected (e.g. each core connected to all the other cores or connected in a specified hierarchy).

The model partitioner 105 provides information regarding the computed partitions to the code generator 106. The model analyzer 104 provides information regarding the implementation constraints to the code generator 106. The code generator 106 then generates the parallelized code based on the behavioral model, the computed partitions, and the implementation constraints. In particular, the code generator 106 converts the functional description of the application in the behavioral model to processor executable instructions. Also, the code generator 106 assigns the computations of each partition to one of the cores.

System 100 also optionally includes test harness 108. In such embodiments, the model analyzer 104 is also configured to perform a number of analyses on the behavioral model, such as "end-to-end type and range propagation" and "auto-test and checking", in order to verify functional correctness and robustness of the behavioral model and the generated code.

For example, in range propagation, the model analyzer 104 propagates value ranges for inputs through the model, taking into account the computational, temporal, and spatial semantics of each block as well as the connectivity between blocks. The model analyzer 104 also computes the possible range of values for the output which are used to compute appropriate downstream ranges.

While propagating ranges, the model analyzer 104 also applies block-specific correctness and robustness rules to input and output ranges. For example, the model analyzer 104 includes the rule that the denominator input of a Divide block should never include zero. Therefore, the model analyzer 104 will discover if the denominator input of a divide block crosses zero with the possibility for a divide-by-zero exception. Other types of analyses are also performed given a data flow model and specifications of the operational ranges of input variables.

For example, the model analyzer 104 searches for the possibility of overflow exceptions by finding points in the behavioral model where internal ranges are not fully contained by the range of values that can be represented by the data types of their associated variables (e.g., if an internal range includes values greater than $2^{32}$ for an unsigned int variable). The model analyzer 104 reports the results of all such analyses and uses these results to generate tests to be run against the parallelized code generated by the code generator 106.

In auto-test and checking, the model analyzer 104 automatically generates tests that specify required input values and expected output values to verify functional correctness. The parallelized generated code is compiled, linked, and loaded on the test harness 108. The generated tests are then run against the parallelized code on the test harness 108 to ensure that the expected values are produced, and hence, verify conformity with low-level functional requirements. The test harness 108 is a testing framework configured to test the generated code by running it under varying conditions and monitoring its behavior and outputs. For example, the test harness 108 can call functions with supplied parameters and print out and compare the results to the desired value. The test harness 108 then outputs a report which can be used to improve the application or generated code.

In some embodiments, the model analyzer 104 includes the Honeywell Integrated Lifecycle Tool Environment (HiLiTE) tool suite produced by Honeywell International, Inc. to verify functional correctness and robustness of the behavioral model. However, it is to be understood that other tools can be used to implement the verification functionality of model analyzer 104. In addition, although the code generator 106 and the model analyzer 104 are shown as separate blocks in this example, it is to be understood that the model analyzer 104 can be integrated with the code generator 106 and/or model partitioner 105 in other embodiments.

Figure 2:
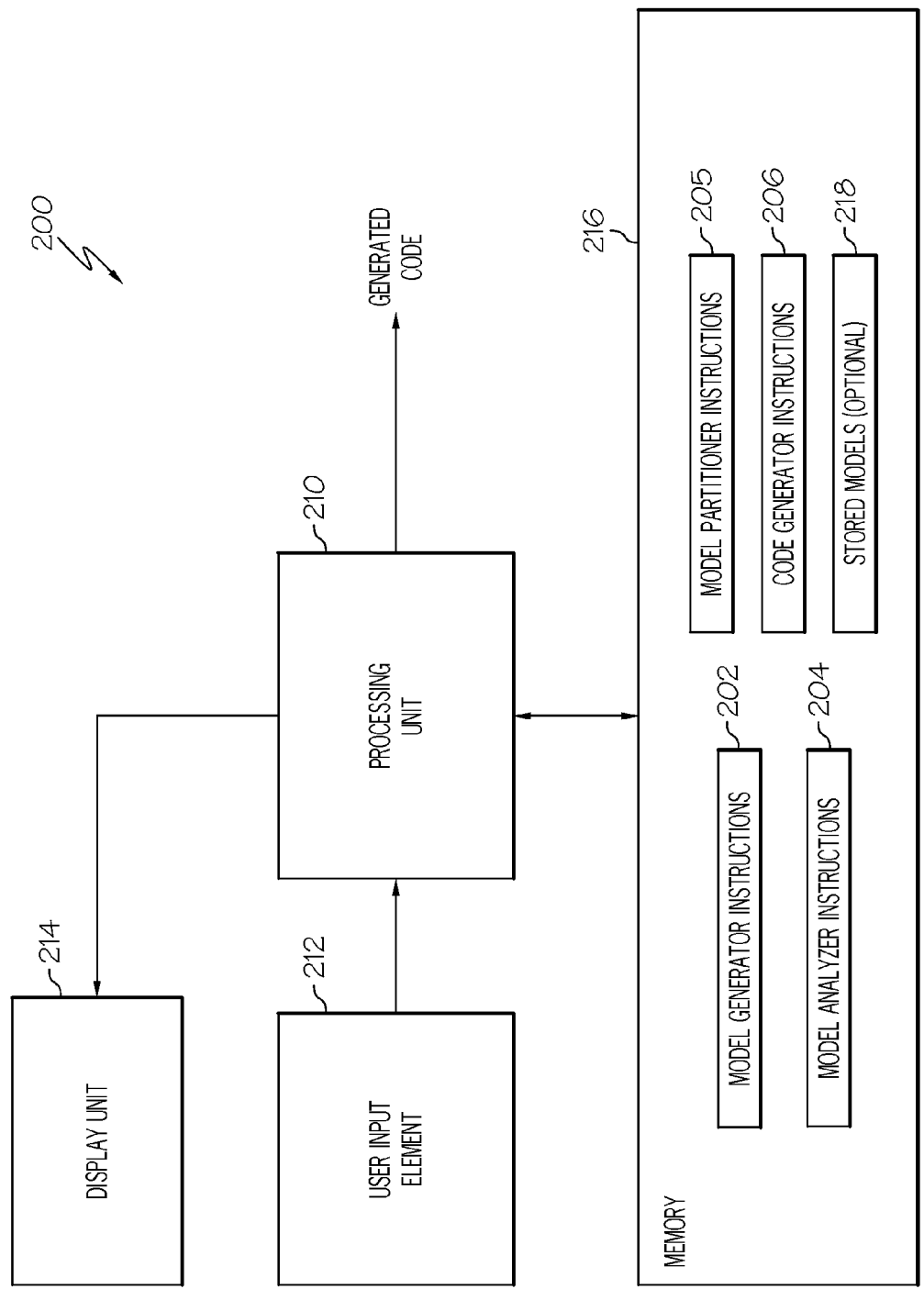
FIG. 2 is a block diagram of one implementation of the exemplary code generation system of FIG. 1.

FIG. 2 is a block diagram of one implementation of the exemplary code generation system 100 of FIG. 1. The code generation system 200 includes a display unit 214, a user input element 212, and a processing unit 210. The user input element 212 is configured to provide behavioral model and other data received from a user to the processing unit 210. For example, the user input element 212 can be implemented as, but is not limited to, keyboards, touch screens, microphones, cursor control devices, line select buttons, etc. In some embodiments, user input element 212 comprises more than one type of input element. The display unit 214 displays graphic representations of the behavioral model produced by the user. Suitable display units include, but are not limited to, various CRT, active and passive matrix LCD, and plasma display units.

The processing unit 210 uses the data received from the user input element 210 to generate the parallelized code. In particular, processing unit includes or functions with software programs, firmware or other computer readable instructions for carrying out various methods, process tasks, calculations, and control functions, used in the generation of parallelized code. For example, in this implementation, the model builder, code generator, model analyzer, and model partitioner are implemented as model builder instructions 202, code generator instructions 206, model analyzer instructions 204, and model partitioner instructions 205, respectively, stored on memory 216. The user-input data flow models 218 can also be optionally stored in the memory 216.

When executed, the instructions cause the processing unit 210 to perform the functions described herein.

The memory 216 can be implemented as any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Although, the model builder instructions 202, code generator instructions 206, model analyzer instructions 204, and model partitioner instructures 205 are described, in this example, as being executed by the same processing unit 210, it is to be understood that each set of instructions can be implemented on separate machines having a respective memory, processing unit, user input element, etc.

Figure 3:
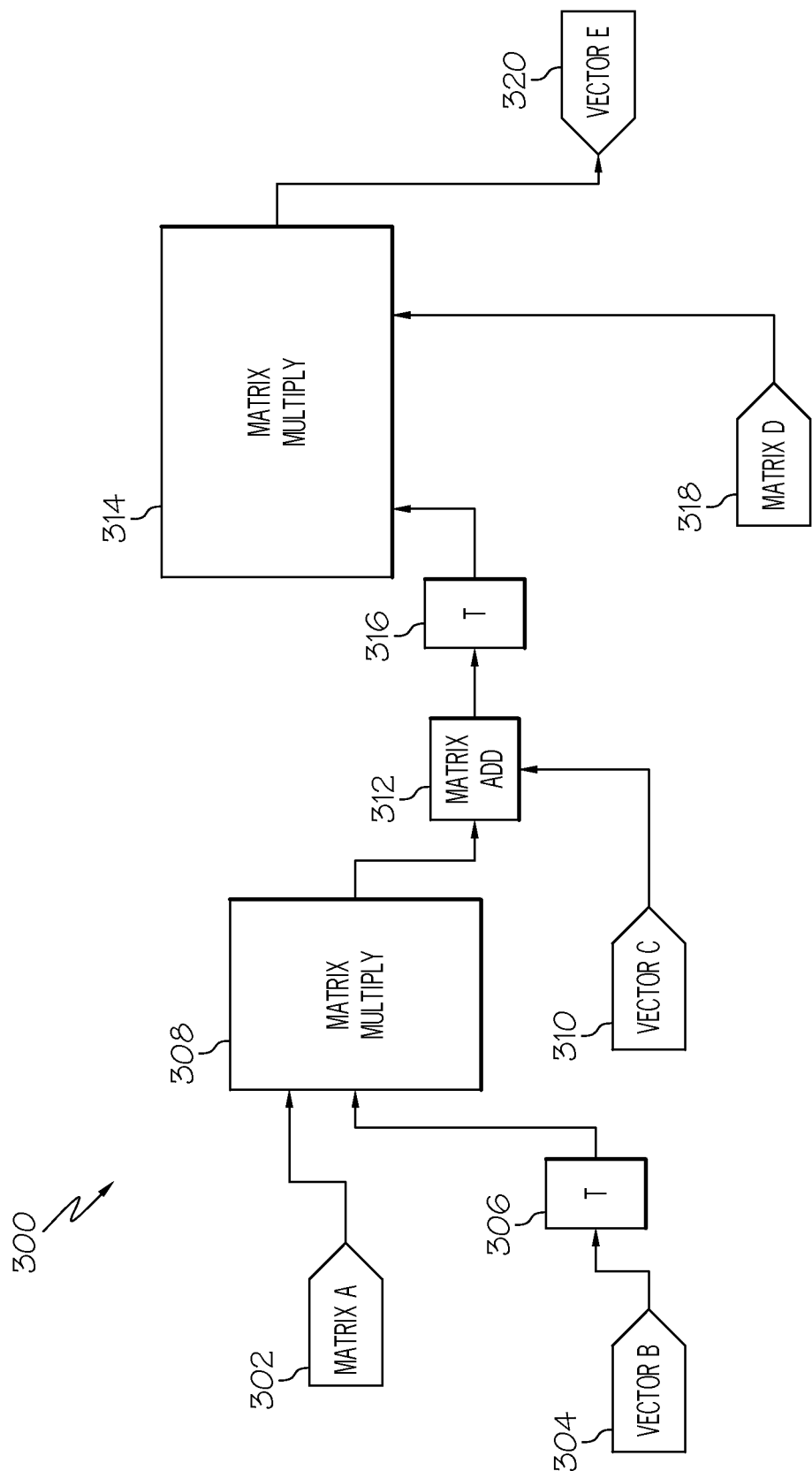
FIG. 3 is a block diagram of an exemplary behavioral model.

FIG. 3 is a block diagram of an exemplary behavioral model 300. It is to be understood that behavioral model 300 is provided by way of explanation and not by way of limitation. In particular, other operations and data types can be included in other behavioral models. In addition, the computational semantics may vary in other embodiments based on the behavioral model used.

Figure 4:
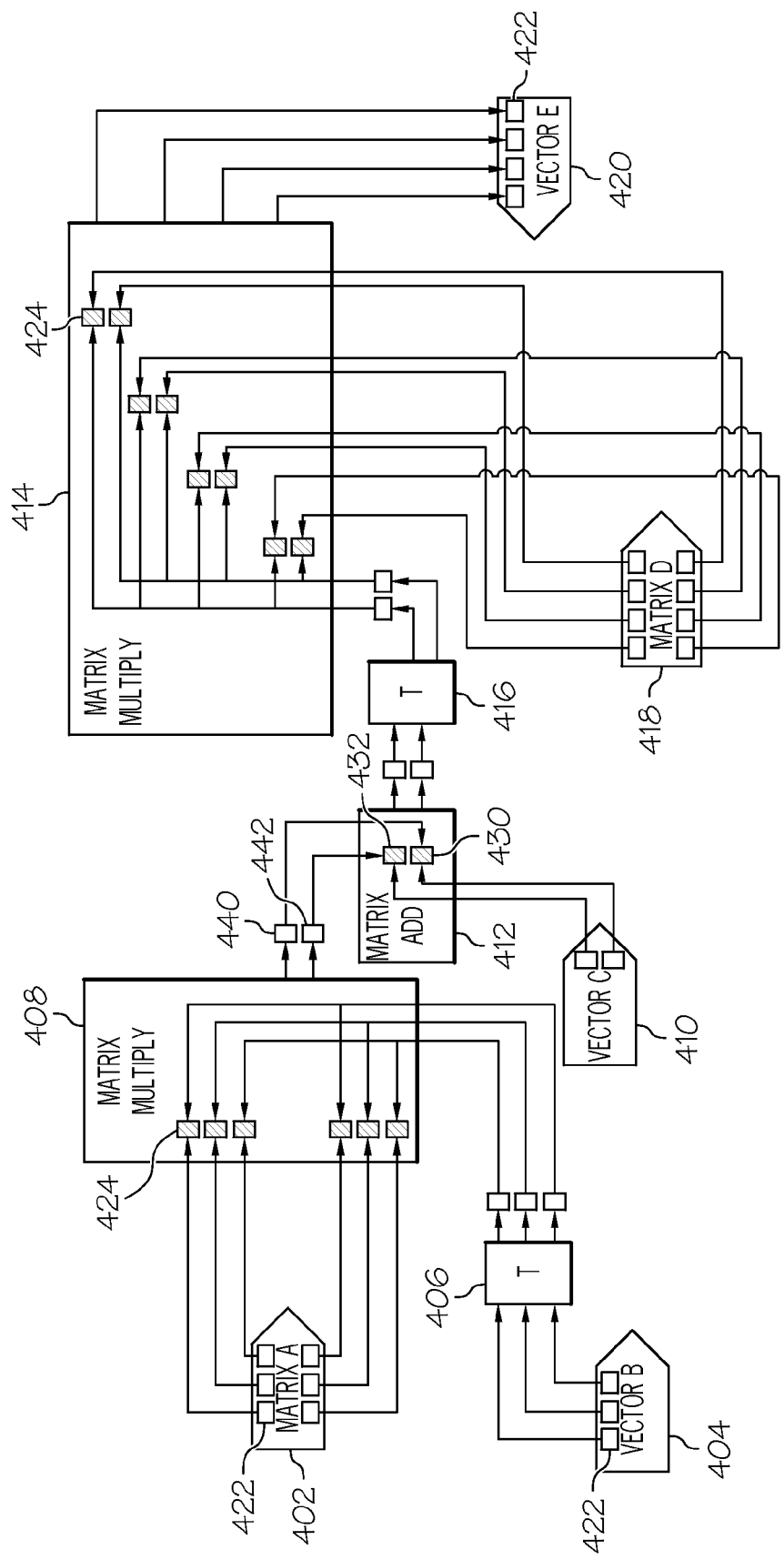
FIG. 4 is a refined block diagram depicting exemplary data dependencies of the exemplary behavioral model of FIG. 3.

The exemplary behavioral model 300 shows a simple data flow representation of the functional requirements of a hypothetical Command, Control, Communications, Computers, Intelligence, Surveillance and Reconnaissance (C4ISR) application. The behavioral model 300 includes four inputs: Matrix A 302, Vector B 304, Vector C 310, and Matrix D 318. The behavioral model also includes a single output, Vector E 320, and two Matrix Multiply blocks 308 and 314, two Transpose blocks 306 and 316, and a Matrix Add block 312. The model analyzer, such as model analyzer 104, identifies the data dependencies of the behavioral model 300 as described above. The model analyzer uses the precise data and computational semantics of each block type in the model to refine the block diagram 300 into the refined block diagram 400 shown in FIG. 4. An example of the precise data and computational semantics of a block type are those of the Matrix Multiply block type shown in FIG. 4. For all blocks in a model of this block type, the element (i, j) of the output depends on the ith row of the first input matrix combined as a dot product with the jth column of the second input matrix. FIG. 4 illustrates these dependencies with the internal computation blocks 424 and edges that connect them in Matrix Multiply blocks 408 and 414.

FIG. 4 is a refined block diagram depicting exemplary data dependencies of the behavioral model 300 of FIG. 3. In FIG. 4, the shaded blocks 424, 430, and 432 represent computation nodes and the empty blocks 422, 440, and 442 represent input and output data. Hence, Matrix A is represented as a two-by-three matrix, while Vector B is represented as a one-by-three vector. Matrix A is multiplied by the transpose of Vector B to result in a two-by-one vector. The shaded blocks 424 inside Matrix Multiply block 308 represent the computation required to compute the dot product for each row of Matrix A 302. The empty blocks 440 and 442 to the right of the Matrix Multiply block 308 indicate each element of the resulting data structure. The shaded blocks 430 and 432 indicate the computation required to perform the Matrix Add 312.

Figure 5:
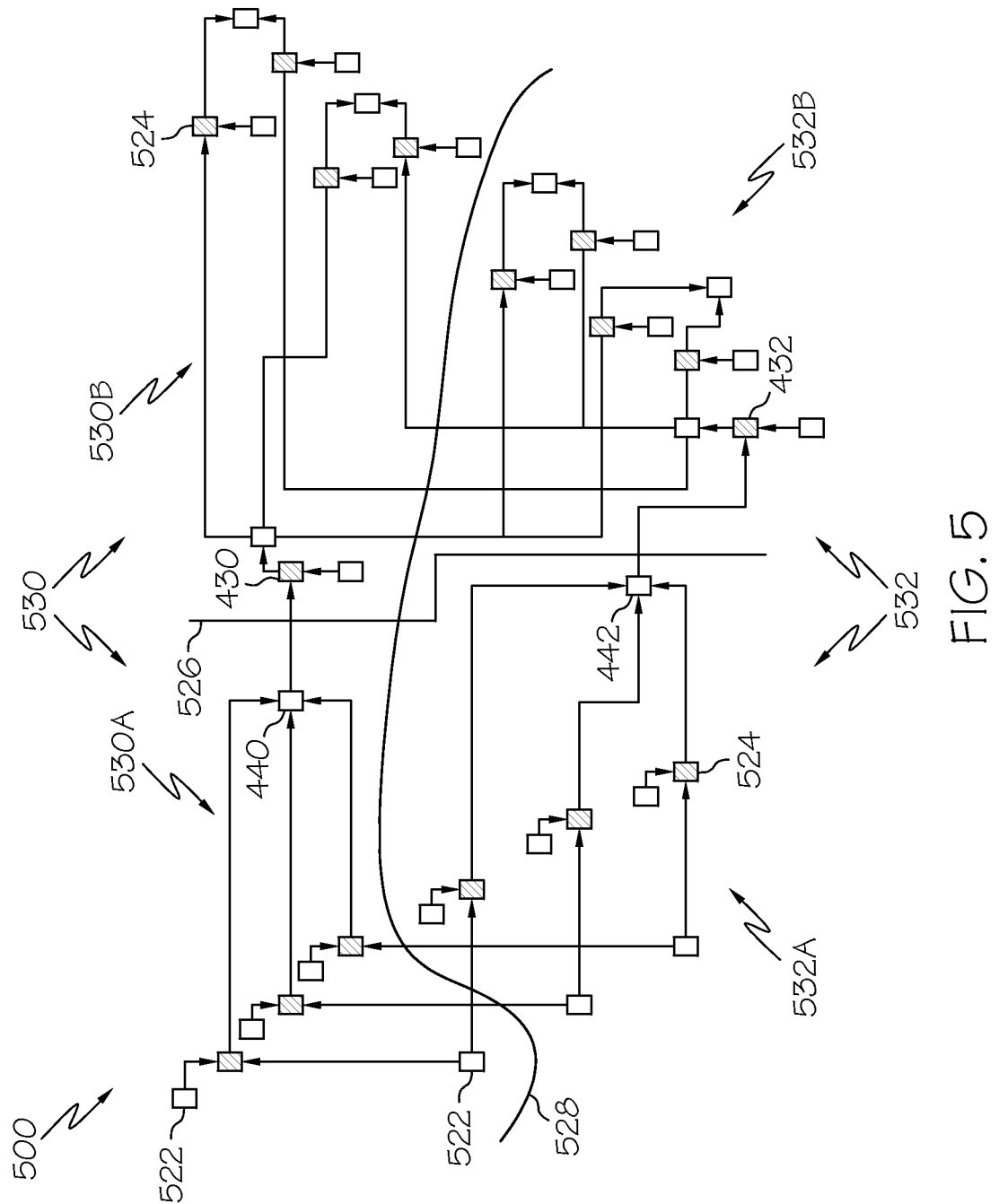
FIG. 5 is a block diagram depicting an exemplary data and computation map corresponding to the exemplary behavioral model of FIG. 3.

This level of abstraction specifies the integrated intra- and inter-block data dependencies of the application as a directed-arc graph (DAG). Based on the identified data dependencies, the model analyzer generates a data and computation map, such as is shown in FIG. 5. As in FIG. 4, the shaded blocks 524 in FIG. 5 represent computation nodes and the empty blocks 522 represent input and output data. The blocks 430, 432, 440, and 442 in FIG. 5 represent the same computation and empty blocks as the respective 430, 432, 440, and 442 in FIG. 4.

The model analyzer can derive properties from the computational semantics of the block types for each empty and shaded block. These properties can include computational and storage requirements. For example, some blocks in FIG. 5 may require more computation than other blocks in FIG. 5. This additional information can be specified in the data and computation map.

Several analyses can be performed at this level of abstraction and the results used to support mapping of the code to multi-core processors. For example, low-level implementation constraints such as buffering requirements or automatic insertion of validation flags can be determined. In some embodiments, the minimum number of implementation constraints is computed. By minimizing or reducing the number of implementation constraints, the code generator has more flexibility to compute the partition boundaries. The computation of implementation constraints is driven by the computational semantics, the connectivity of the blocks, and the language-, hardware-, and process-specific requirements.

The data and computation map 500 in FIG. 5 shows the data and computational dependencies from FIG. 4 in isolation. That is, the blocks from FIGS. 3 and 4 have been removed leaving only the augmented DAG representation. For illustrative purposes the positions of the data nodes 522 and computation nodes 524 have been adjusted without changing the connectivity among the nodes. FIG. 5 shows a single implementation constraint 526, which represents a region of model just prior to the Matrix Add block 312 in FIG. 3 at which the internal values of the computation are to be written out to a globally accessible variable to support verification of the generated code. However, it is to be understood that the number of implementation constraints depends on the particular structure of the behavioral model and the language-, hardware-, and process-specific requirements.

The model partitioner computes a partitioning of the blocks of the data and computation map based on the structure of the map, the block properties, and the implementation constraints. The partition boundary 528 represents a possible partitioning of the exemplary behavioral model into two sub-domains. The partition boundary 528 is selected based on a common type of implementation constraint: load balance across processors. This constraint requires that the amount of computation performed by each processor is approximately the same. For example, FIG. 5 includes two partitions 530 and 532 that contain the same number of computation nodes.

Other types of implementation constraints, such as sequential partitioning of tasks for a balanced pipeline, can require even finer-grained load balancing. For example, if line 526 in FIG. 5 were to represent a pipelining boundary, it would be necessary to select a partitioning such that the amount of computation was balanced across processors for each segment of the pipeline. The segments of partition 530 defined by line 526 are denoted 530A and 530B. The segments of partition 532 are similarly denoted 532A and 532B. As can be seen in FIG. 5, partition segment 530A has approximately the same number of computation nodes 524 as partition segment 532A. Similarly, partition segment 530B has approximately the same number of computation nodes 524 as partition segment 532B. Thus, if each node 524 requires approximately the same computation as the other nodes 524, each core performs approximately the same amount of computation for each pipeline segment.

In addition, the partition boundary 528 is chosen to reduce the inter-processor communications as represented by the number of lines or wires crossed by the partitioning boundary 528. Each time the partition boundary 528 crosses a line, the cores of the multi-core processor may need to communicate data to one another in order to complete the computation. Whether or not the processors need to communicate data may depend on an implementation constraint. For example, communication is generally not required if the cut line traces backwards directly to an external, globally-accessible variable. In the example shown in FIG. 5, nodes 522 are globally-accessible variables. Hence, even though the partition boundary cuts a line that traces backwards (i.e., to the left in FIG. 5) to 522, inter-processor communication may not be needed for this cut line.

The code generator is configured to map each partition sub-domain onto a core of the multi-core processor. The code generator generates the code that is specified for each core as well as the inter-processor communication code that is required by the mapping. The nodes 524 and 522 in each sub-domain represent the computation or data management for each processor, while the edges cut by the partition boundary 528 specify the inter-processor communications. Hence, the partitioned data and computation map is used to efficiently and automatically generate an inter-processor computation and communication scheme unique to the mapping of a given application onto a given number of cores. The data and computation map explicitly specifies the range of possible task and data parallelism. Whereas in conventional source code, a specific sequential execution order can be unnecessarily implied that can prevent maximal parallelism.

Figure 6:
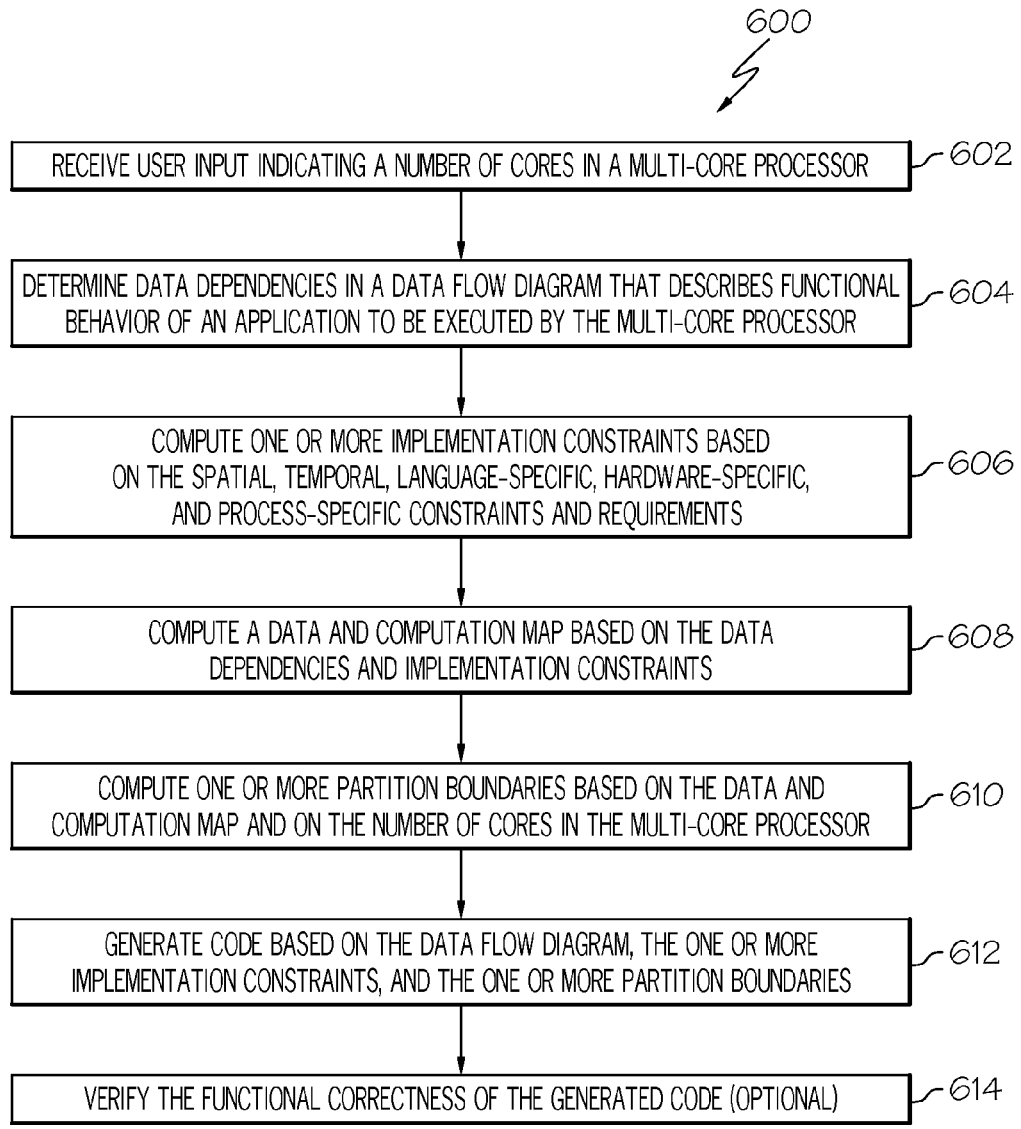
FIG. 6 is a flow chart of one embodiment of a method of generating parallelized code.

FIG. 6 is a flow chart of one embodiment of a method 600 of generating parallelized code. Method 600 can be implemented by a code generation system such as code generation system 100 described above. At block 602, user input indicating the number of cores in a target multi-core processor is received. Additional information regarding the target multi-core processor can also be received in other embodiments. For example, information regarding cache size and connectivity of the cores in the multi-core processor is also received. At block 604, data dependencies in a data flow diagram are determined as described above. The data flow diagram describes functional behavior of an application to be executed by the multi-core processor. The data flow diagram is generated based on user input, as described above, or from a model stored in memory.

At block 606, one or more implementation constraints are computed. In some embodiments, the model analyzer is configured at block 606 to detect feedback loops in the model. Feedback loops require that one or more state variables exist in the generated code to maintain the one or more feedback values across time steps.

Additionally, in some embodiments, the model analyzer is configured at block 606 to detect one or more blocks in the model that are associated with one or more specific library calls. Blocks that are associated with one or more specific library calls require that the generated code call the appropriate one or more library functions rather than generate the behavior code as normal. In addition, in some embodiments, the model analyzer is configured at block 606 to detect one or more verification points in the model. Verification points require that the generated code contain one or more global variables that are assigned values based on one or more values of otherwise inaccessible internal variables in the code.

Furthermore, in some embodiments, the model analyzer is configured at block 606 to detect one or more pipeline segment boundaries in the model. Pipeline segment boundaries require fine-grained load balancing of computation across processors at each segment in the pipeline, while also minimizing communications overhead. Also, in some embodiments, the model analyzer is configured at block 606 to detect one or more globally external variables. Inter-processor communication may not be required in the generated code when different processors access globally external variables. In some embodiments, the generated code may require calls to lock one or more semaphores or mutexes for globally external variables. Other implementation constraints are also possible in other embodiments. In some embodiments, the minimum number of implementation constraints necessary to satisfy the language-specific, hardware-specific, and process-specific constraints are determined.

At block 608, a data and computation map is computed as described above. The data and computation map depicts the connectivity between computation nodes and data input/outputs as described above. The structure of the data and computation map may depend on one or more implementation constraints. In some embodiments, one or more detected feedback may be annotated in the data and computation map. In some embodiments, one or more blocks in the model that are associated with one or more specific library calls may be annotated in the data and computation map. In some embodiments, one or more verification points may be annotated in the data and computation map. In some embodiments, one or more pipeline segment boundaries may be annotated in the data and computation map. In some embodiments, one or more globally external variables may be annotated in the data and computation map.

At block 610, one or more partition boundaries are computed as described above. In particular, in some embodiments, the one or more partition boundaries are computed such that the partition boundaries cross a minimum number of lines connecting data and computation nodes in the data and computation map. The number of partition boundaries is computed based on the number of cores in the multi-core processor. In addition, in some embodiments, the partition boundaries are computed based on implementation constraints, such as, but not limited to, model feedbacks, blocks associated with library calls, pipelines, globally external variables, and verification requirements. Other implementation constraints are also possible.

At block 612, code based on the data flow diagram, the one or more implementation constraints, and the one or more partition boundaries is generated as described above. In some embodiments, one or more state variables are generated in the code to maintain the one or more feedback values across time steps. For example, code can be generated for one or more state variables that persist from one execution frame to the next based on the one or more implementation constraints In some embodiments, one or more library function calls are generated in the code rather than behavior code. In some embodiments, one or more global variables that are assigned values based on one or more values of otherwise inaccessible internal variables are generated in the code. In some embodiments, pipelined code is generated rather than unpipelined behavioral code. In some embodiments, the code generated is configured to not generate unnecessary inter-processor communications code for different processors that access globally external variables. In some embodiments, the one or more semaphores or mutexes are generated for globally external variables. Other variations in generated code are also possible based on other implementation constraints.

At block 614, the functional correctness of the generated code is verified, such as by end-to-end type and range propagation, or by auto-test and checking For example, in some embodiments the model analyzer generates one or more tests of functional correctness that are performed on a test harness to test the generated code, as described above. The results of the performed tests can be output in a report to provide feedback to the behavioral model developer to guide and constrain design choices as well as a basis to evaluate system-level tradeoffs, such as the tradeoff between parallelization overhead and core utilization.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A code generation system, the system comprising:
    a memory configured to store model analyzer instructions, model partitioner instructions, and code generator instructions;
    a processing unit configured to execute the model analyzer instructions to implement a model analyzer, to execute the model partitioner instructions to implement a model partitioner, and to execute the code generator instructions to implement a code generator; and
    at least one user input element configured to provide data received from a user to the processing unit;
    wherein the model analyzer is configured to identify data dependencies in a non-executable data flow diagram that describes functional behavior of an application, wherein the model analyzer is further configured to compute a data and computation map based on the data dependencies and to compute one or more implementation constraints;
    wherein the data flow diagram comprises a plurality of functional blocks and the data and computation map depicts data inputs/outputs of and computations performed by each of the functional blocks without explicit reference to the corresponding functional blocks;
    wherein the model partitioner is configured to compute one or more partition boundaries based on the data and computation map and the one or more implementation constraints; and
    wherein the code generator is configured to generate executable parallelized code based on the data flow diagram, the one or more implementation constraints, and the one or more partition boundaries, wherein the code generator is configured to map the code corresponding to each partition defined by the one or more partition boundaries to one of a plurality of cores of a multi-core processor, and to generate inter-core communication code for at least one line of the data and computation map crossed by the one or more partition boundaries.

2. The code generation system of claim 1, wherein the model partitioner is further configured to compute the one or more partition boundaries based on the one or more implementation constraints such that a number of computations in each partition defined by the one or more partition boundaries is approximately equal across implementation constraints.

3. The code generation system of claim 1, wherein the model analyzer is configured to minimize the number of implementation constraints computed.

4. The code generation system of claim 1, wherein the code generator is further configured to generate code for one or more state variables that persist from one execution frame to the next based on the one or more implementation constraints.

5. The code generation system of claim 1, wherein the code generator is further configured to generate code by directly calling one or more library function based on one or more implementation constraints.

6. The code generation system of claim 1, wherein the data and computation map comprises a plurality of lines; and wherein the model partitioner is further configured to compute the one or more partition boundaries such that a minimum number of lines in the data and computation map are crossed by the one or more partition boundaries.

7. The code generation system of claim 1, wherein the model analyzer is further configured to verify the functional correctness of the parallelized code generated by the code generator.

8. The code generation system of claim 7, further comprising:
    a test harness;
    wherein the model analyzer is further configured to generate one or more tests of functional correctness to verify the functional correctness of the parallelized code generated by the code generator;
    wherein the test harness is configured to perform the one or more tests of functional correctness on the parallelized code and to output a report of results of the one or more performed tests of functional correctness.

9. A program product comprising a non-transitory processor-readable medium on which program instructions are embodied, wherein the program instructions are configured, when executed by at least one programmable processor, to cause the at least one programmable processor to:
    determine data dependencies in a non-executable data flow diagram that describes functional behavior of an application, the data flow diagram comprising a plurality of functional blocks;
    compute a data and computation map based on the data dependencies, the data and computation map depicting data inputs/outputs of and computations performed by each of the functional blocks without explicit reference to the corresponding functional blocks;
    compute one or more implementation constraints; and
    compute one or more partition boundaries based on the data and computation map and on the one or more implementation constraints.

10. The program product of claim 9, wherein the program instructions are further configured to cause the at least one programmable processor to:
    compute the one or more partition boundaries such that a number of computations in each partition defined by the one or more partition boundaries is approximately equal between implementation constraints.

11. The program product of claim 9, wherein the program instructions are further configured to cause the at least one programmable processor to:
    generate code for one or more state variables that persist from one execution frame to the next based on one or more implementation constraints.

12. The program product of claim 9, wherein the program instructions are further configured to cause the at least one programmable processor to:
   compute the one or more partition boundaries such that a minimum number of lines in the data and computation map are crossed by the one or more partition boundaries.

13. The program product of claim 9, wherein the program instructions are further configured to cause the at least one programmable processor to:
   generate code based on the data flow diagram, the one or more implementation constraints, and the one or more partition boundaries;
   map generated code corresponding to each partition defined by the one or more partition boundaries to one of a plurality of cores of a multi-core processor; and
   generate inter-core communication code for at least one line of the data and computation map crossed by the one or more partition boundaries.

14. The program product of claim 13, wherein the program instructions are further configured to cause the at least one programmable processor to:
   verify the functional correctness of the code generated by the code generator.

15. The program product of claim 14, wherein the program instructions are further configured to cause the at least one programmable processor to verify the functional correctness of the code generated by the code generator by causing the at least one programmable processor to:
   generate one or more tests of functional correctness;
   perform the one or more tests on a test harness; and
   output a report of results of the one or more performed tests.

16. A method of generating parallelized code, the method comprising:
   receiving user input indicating a number of cores in a multi-core processor;
   determining data dependencies in a non-executable data flow diagram that describes functional behavior of an application to be executed by the multi-core processor, the data flow diagram comprising a plurality of functional blocks;
   computing a data and computation map based on the data dependencies, the data and computation map depicting data inputs/outputs of and computations performed by each of the functional blocks without explicit reference to the corresponding functional blocks;
   computing one or more implementation constraints;
   computing one or more partition boundaries based on the data and computation map, the one or more implementation constraints, and the number of cores in the multi-core processor; and
   generating executable code based on the data flow diagram, the one or more implementation constraints, and the one or more partition boundaries.

17. The method of claim 16, wherein computing the one or more implementation constraints further comprises determining one or more state variables that persist from one execution frame to the next.

18. The method of claim 16, wherein computing the one or more partition boundaries further comprises computing the one or more partition boundaries such that a minimum number of lines in the data and computation map are crossed by the one or more partition boundaries.

19. The method of claim 16, wherein computing one or more partition boundaries comprises computing one or more partition boundaries such that a number of computations in each partition defined by the one or more partition boundaries is approximately equal between implementation constraints.

20. The method of claim 16, further comprising:
   generating one or more tests for the generated code;
   testing the generated code based on the generated tests; and
   outputting a report based on the tests of the generated code.

* * * * *